(12) United States Patent
Park et al.

(10) Patent No.: US 9,461,338 B2
(45) Date of Patent: Oct. 4, 2016

(54) BATTERY ASSEMBLY

(75) Inventors: Sang-Hun Park, Yongin-si (KR); Dae-Yon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1096 days.

(21) Appl. No.: 13/344,533

(22) Filed: Jan. 5, 2012

(65) Prior Publication Data

US 2012/0208047 A1    Aug. 16, 2012

(30) Foreign Application Priority Data

Feb. 11, 2011 (KR) .................. 10-2011-0012459

(51) Int. Cl.
*H01M 2/02* (2006.01)
*H01M 10/42* (2006.01)

(52) U.S. Cl.
CPC ......... *H01M 10/425* (2013.01); *H01M 2/0212* (2013.01)

(58) Field of Classification Search
CPC .............. H01M 2/02; H01M 2/0207–2/0215; H01M 2/24; H01M 2/30; H01M 10/425
See application file for complete search history.

(56) References Cited

U.S. PATENT DOCUMENTS

| 6,218,041 B1 * | 4/2001 | Barbier et al. ................. 429/96 |
| 7,879,477 B2 | 2/2011 | Seo et al. |
| 2004/0095093 A1 * | 5/2004 | Baba et al. .................... 320/112 |
| 2005/0112415 A1 | 5/2005 | Takeshita et al. |
| 2006/0061332 A1 * | 3/2006 | Neu et al. ..................... 320/132 |
| 2008/0241654 A1 | 10/2008 | Koh et al. |
| 2008/0292955 A1 * | 11/2008 | Byun et al. ................... 429/163 |
| 2009/0130550 A1 * | 5/2009 | Kim .............................. 429/163 |
| 2010/0003585 A1 * | 1/2010 | Takahashi et al. ........... 429/100 |
| 2010/0092859 A1 | 4/2010 | Kim et al. |
| 2010/0136419 A1 | 6/2010 | Kwak et al. |

FOREIGN PATENT DOCUMENTS

| JP | 2001-266820 | 9/2001 |
| JP | 2004-319314 | 11/2004 |
| JP | 2010-055957 | 3/2010 |
| KR | 10-2005-0037366 | 4/2005 |
| KR | 10-2007-0067781 | 6/2007 |
| KR | 10-0770097 B1 | 10/2007 |
| KR | 10-2008-0087959 | 10/2008 |
| KR | 10-2010-0041689 | 4/2010 |
| KR | 10-2010-0063378 | 6/2010 |

OTHER PUBLICATIONS

KIPO Office action dated Jul. 20, 2012, for Korean priority Patent application 10-2011-0012459, (9 pages).
Patent Abstracts of Japan, and English machine translation of Japanese Publication 2001-266820 listed above, (48 pages).

(Continued)

*Primary Examiner* — Alix Eggerding
(74) *Attorney, Agent, or Firm* — Lewis Roca Rothgerber Christie LLP (57) ABSTRACT

A battery pack including a core pack including a unit cell; a protection circuit module electrically connected to the core pack; and a frame including a first region accommodating the core pack and a second region accommodating the protection circuit module, the frame further including a supporting portion supporting the protection circuit module in the second region, and a partition wall dividing the first region and the second region from each other.

19 Claims, 10 Drawing Sheets

(56) References Cited

OTHER PUBLICATIONS

Patent Abstracts of Japan, and English machine translation of Japanese Publication 2004-319314 listed above, (70 pages).

Patent Abstracts of Japan, and English machine translation of Japanese Publication 2010-055957 listed above, (31 pages).

* cited by examiner

BATTERY ASSEMBLY

CROSS-REFERENCE TO RELATED APPLICATION

This application claims priority to and the benefit of Korean Patent Application No. 10-2011-0012459, filed on Feb. 11, 2011 in the Korean Intellectual Property Office, the entire content of which is incorporated herein by reference.

BACKGROUND

1. Field

Aspects of embodiments of the present invention relate to a battery pack, and more particularly, to a structure of a battery pack.

2. Description of the Related Art

The supply of portable computers that are operable by using a battery without a power supply device is quickly increasing according to development of wireless Internet and communication technologies. Generally, portable computers have excellent mobility since portable computers are small and easy to carry, and thus are widely used for business or personal use. Portable computers may include a built-in battery pack so as to be freely used in various places without a power supply device. Also, a built-in battery pack may include a secondary battery that is repeatedly used via charging and discharging.

SUMMARY

According to an aspect of embodiments of the present invention, a battery pack separates a core pack and a protection circuit module and supports the protection circuit module.

Additional aspects will be set forth in part in the description which follows and, in part, will be apparent from the description, or may be learned by practice of the presented embodiments.

According to one or more embodiments of the present invention, a battery pack includes a core pack including a unit cell; a protection circuit module electrically connected to the core pack; and a frame including a first region accommodating the core pack and a second region accommodating the protection circuit module, the frame further including a supporting portion supporting the protection circuit module in the second region, and a partition wall dividing the first region and the second region from each other.

The frame may have an opening formed on at least one of a first side surface or a second side surface opposite the first side surface.

The frame may further include a core pack supporting portion supporting the core pack.

The core pack supporting portion may extend along at least a part of an edge of the first region. The core pack supporting portion may extend in a lengthwise direction of the protection circuit module. The core pack supporting portion may be arranged at each corner of the first region. In one embodiment, the frame has a rectangular band shape that is parallel to a thickness direction of the core pack.

The frame may have an opening formed on at least one side surface of a first side surface and a second side surface of the second region.

The battery pack may further include a connection tap including an end connected to the core pack and another end connected to the protection circuit module, wherein the connection tap is bent.

In one embodiment, the frame has an opening formed on at least one of a first side surface or a second side surface of the second region, and the connection tap is connected to the protection circuit module via the opening.

The partition wall may be between first and second portions of the bent connection tap.

A groove may be formed in the partition wall at a location corresponding to the first and second portions of the connection tap.

The frame may further include a side wall facing the partition wall, the protection circuit module being between the partition wall and the side wall, and a groove may be formed in the side wall at a location corresponding to a bent portion of the connection tap.

The partition wall may extend in a lengthwise direction of the protection circuit module. The partition wall may face the protection circuit module and be parallel to the protection circuit module.

The protection circuit module may include a thermister, and a groove may be formed in the partition wall at a location corresponding to the thermister.

The core pack may include two or more unit cells.

A slit may be formed in the supporting portion, and the protection circuit module may be supported in the slit. The supporting portion may include a substrate guide portion. The supporting portion may include an elastic portion for supporting the protection circuit module.

The frame may further include a fastening portion extending from the frame and configured to be fastened to an object.

The battery may further include a cover accommodating the core pack therein, the cover being coupled to the frame. The cover may include a metal.

According to an aspect of embodiments of the present invention, when an electrolyte leaks from the core pack, the battery pack may prevent or substantially prevent the electrolyte from contacting the protection circuit module by dividing the core pack and the protection circuit module by the partition wall.

BRIEF DESCRIPTION OF THE DRAWINGS

The above and other features and advantages will become more apparent to those of ordinary skill in the art by describing in detail some exemplary embodiments of the present invention with reference to the attached drawings, which are incorporated in and constitute a part of this specification. The drawings illustrate some exemplary embodiments of the present disclosure, of which.

DETAILED DESCRIPTION

Some exemplary embodiments of the present invention will be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1:
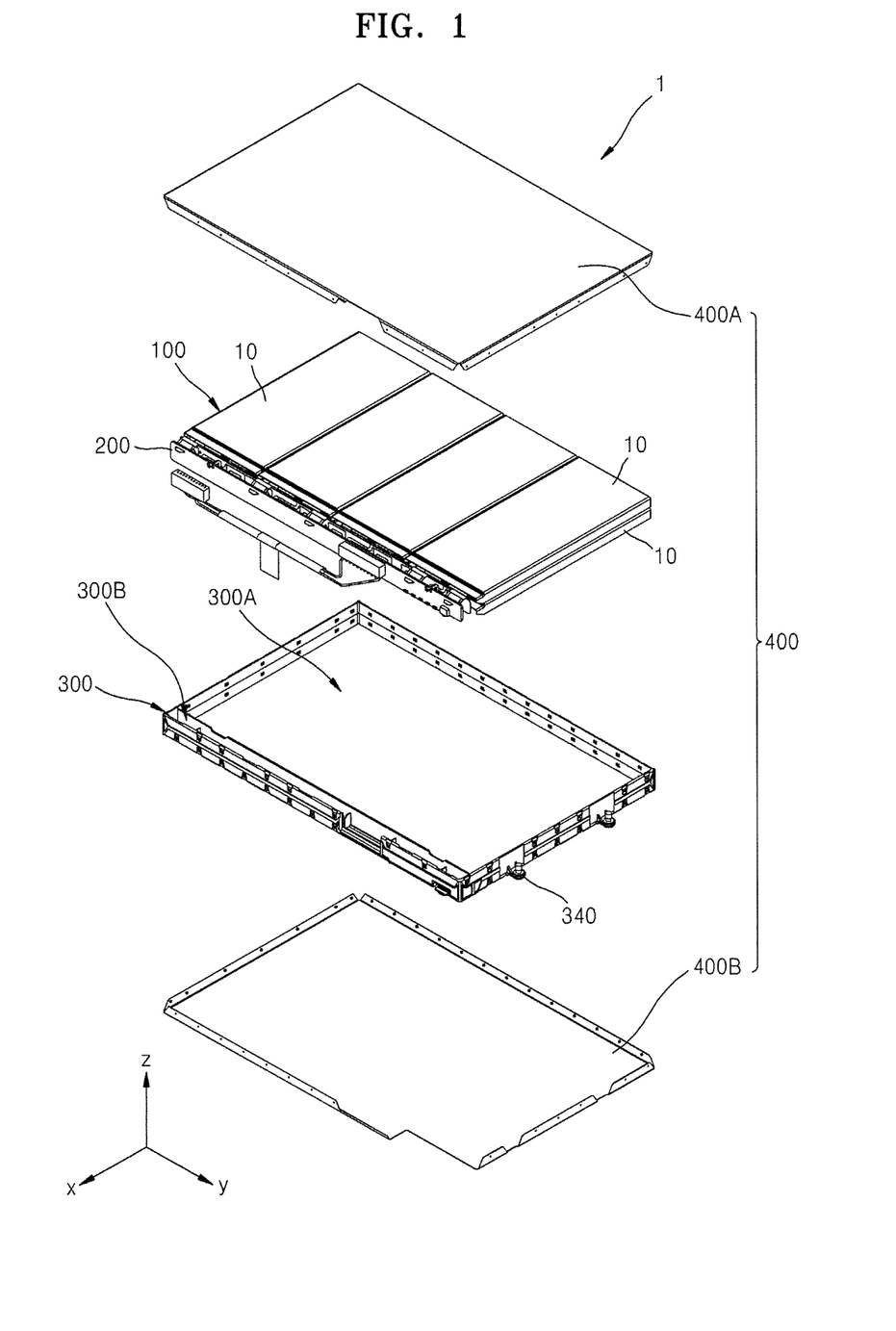
FIG. 1 is a schematic exploded perspective view of a battery pack according to an embodiment of the present invention.

FIG. 1 is a schematic exploded perspective view of a battery pack 1 according to an embodiment of the present invention. Referring to FIG. 1, the battery pack 1 includes a core pack 100, a protection circuit module 200, a frame 300, and a cover 400.

The core pack 100 may include a rechargeable unit cell 10. The unit cell 10 may be a secondary battery. For example, the unit cell 10 may be a lithium secondary battery or a polymer-type battery. In one embodiment, the core pack 100 may include two or more of the unit cells 10. The plurality of unit cells 10 may be connected to one another in series or in parallel to configure the core pack 100. For example, referring to FIG. 1, in one embodiment, the core pack 100 may include eight unit cells 10. For example, in one embodiment, as shown in FIG. 1, the core pack 100 may include four pairs of the unit cells 10 which are connected to each other in parallel, wherein the four pairs are connected to each other in series. However, the number and the method of connecting the unit cells 10 are not limited to the example illustrated in FIG. 1, but, rather, the number and the method of connecting the unit cells 10 may be modified in various ways. The core pack 100 may supply power to various electronic devices. For example, the core pack 100 may supply power to a notebook computer or a power tool.

The protection circuit module 200 is electrically connected to the core pack 100. The protection circuit module 200 may prevent or substantially prevent overheating and explosion occurring due to overcharging, overdischarging, or overcurrent of the core pack 100. The protection circuit module 200, in one embodiment, may include a substrate 210 disposed on one side of the core pack 100 and a protection device 220 mounted on the substrate 210 (see FIG. 6). The protection device 220 may be formed of a safety device including a passive device, such as a resistor or a condenser, or an active device, such as a field-effect transistor, or may be formed of integrated circuits. The protection device 220 may include, for example, a positive temperature coefficient (PTC).

The frame 300, in one embodiment, accommodates the core pack 100 and the protection circuit module 200. The frame 300 will be described later in further detail with reference to FIG. 2A.

The cover 400, in one embodiment, accommodates the core pack 100 and may be coupled to the frame 300. In one embodiment, the cover 400 may be formed of a metal so as to decrease a thickness of the battery pack 1. For example, the cover 400 may be formed of stainless steel (e.g., SUS). Although not shown in the drawings, in one embodiment, an insulating tape may be disposed between the cover 400 and the core pack 100. The insulating tape may insulate the cover 400 (e.g., formed of a metal) and the core pack 100 from each other. The insulating tape may also insulate the cover 400 and the protection circuit module 200 from each other.

In one embodiment, as shown in FIG. 1, the cover 400 includes an upper cover 400A and a lower cover 400B. However, the present invention is not limited thereto, and, in another embodiment, the cover 400 may be integrally formed. The cover 400, in one embodiment, may be formed of thin plate, such that the entire thickness of the battery pack 1 may be decreased. However, since the cover 400 is formed of a metal, it may be difficult to form the inside of the cover 400 so as to fix the core pack 100 or the protection circuit module 200. Therefore, according to an embodiment of the present invention, the frame 300 is formed of a material that is easily molded and formed so as to accommodate the core pack 100 and the protection circuit module 200.

Figure 2A:
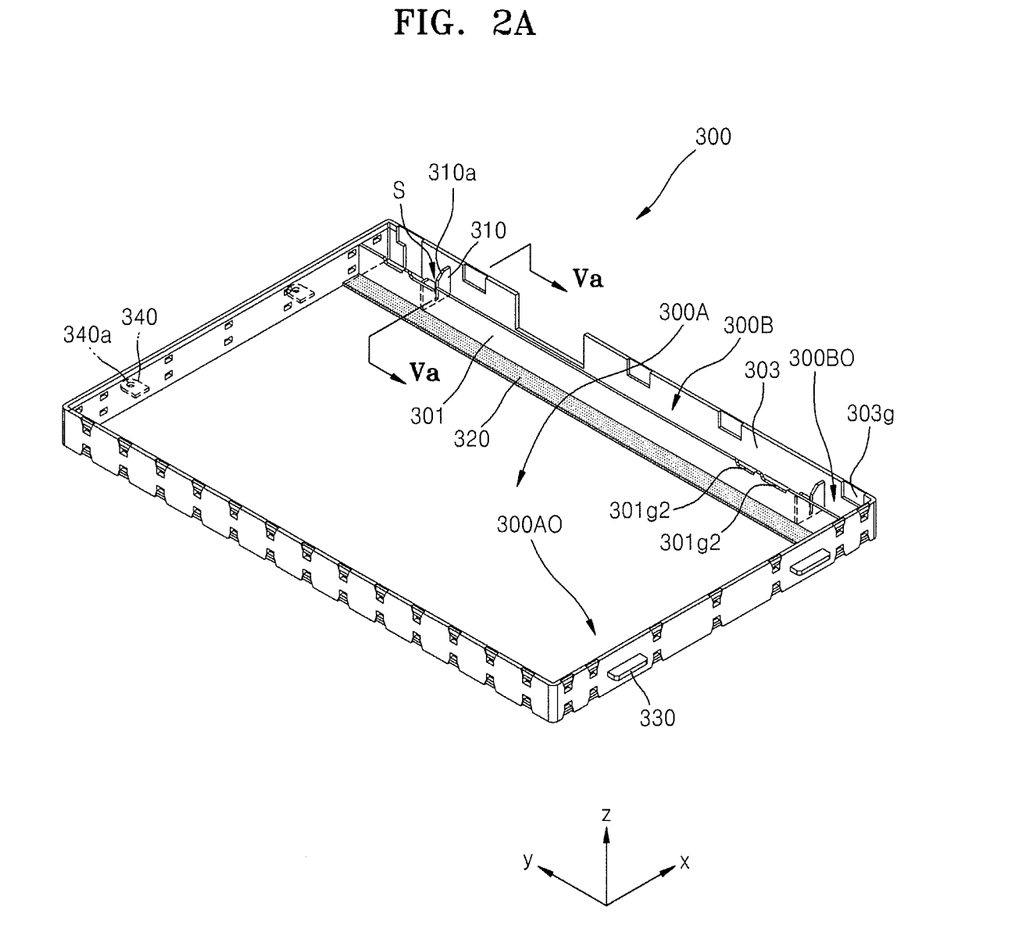
FIG. 2A is a schematic perspective view of a frame of the battery pack of FIG. 1.

According to one embodiment, the frame 300 accommodates the core pack 100 and the protection circuit module 200 and is capable of being coupled to the cover 400. The frame 300 will be described further with reference to FIG. 2A. FIG. 2A is a schematic perspective view of the frame 300 of the battery pack 1 of FIG. 1.

Referring to FIG. 2A, the frame 300, in one embodiment, includes a first region 300A and a second region 300B. The first region 300A and the second region 300B may be divided by a partition wall 301. The frame 300, in one embodiment, may have a generally rectangular shape. In one embodiment, the first region 300A of the frame 300 may be at least partially surrounded by a side wall having a band shape such that a surface of the side wall is parallel to a thickness direction of the core pack 100. The second region 300B may be at least partially surrounded by a side wall having a band shape so as to at least partially surround the protection circuit module 200. A surface of the side wall may be parallel to a thickness direction of the core pack 100. That is, the frame 300 may have a generally rectangular band shape that is parallel to the thickness direction of the core pack 100. In one embodiment, the partition wall 301 may be a common side wall for dividing the first region 300A and the second region 300B. In one embodiment, the partition wall 301 may be formed inside the band-shaped side wall having a generally rectangular shape so as to divide the first region 300A and the second region 300B. However, a shape of the frame 300 according to the present invention is not limited thereto. In another embodiment, the frame 300 may have a hexahedral shape based on a band shape according to a degree to which a first aperture 300AO or a second aperture 300BO are covered.

The first region 300A may accommodate the core pack 100, and the second region 300B may accommodate the protection circuit module 200. The frame 300, in one embodiment, may include an insulating member. The insulating member may be a highly polymerized compound that may be molded through plastic deformation by using heat and/or pressure. The frame 300, in one embodiment, may be formed of an insulating member. Alternatively, the frame 300 may be coated by an insulating member. If the core pack 100 includes a polymer battery and is formed through injection molding by putting the core pack 100 and the protection circuit module 200 in a mold, an operational problem may occur in a PTC device included in the protection circuit module 200 due to heat of the molded product. However, according to embodiments of the present invention, the frame 300 is formed separately from the core pack 100 and the protection circuit module 200 and is coupled to each of the core pack 100 and the protection circuit module 200, and thus an operational problem in the PTC device included in the protection circuit module 200 is prevented or substantially prevented, thereby decreasing defects.

As depicted in FIG. 2A, the frame 300 including the first region 300A and the second region 300B may be integrally formed. However, the present invention is not limited thereto and, in another embodiment, the frame 300 may be formed in a plurality of portions.

The first region 300A includes a space for accommodating the core pack 100. In one embodiment, the first aperture 300AO may be formed in at least one side surface of a first side surface and a second side surface in a Z-axis direction (e.g., a thickness direction of the core pack 100) of the first region 300A. Referring to FIG. 2A, in one embodiment, the first aperture 300AO is formed in opposite sides of the first region 300A. Further, in one embodiment, the first aperture 300AO of the first region 300A may be partially covered by a core pack supporting portion 320. In one embodiment, as shown in FIG. 2A, the core pack supporting portion 320 is disposed to be adjacent to the partition wall 301. However, the present invention is not limited thereto, and, in other embodiments, the core pack supporting portion 320 may be disposed at any of various positions. Various configurations of a core pack supporting portion according to other embodiments of the present invention will be described with reference to FIGS. 2B through 2D.

Figure 2B:
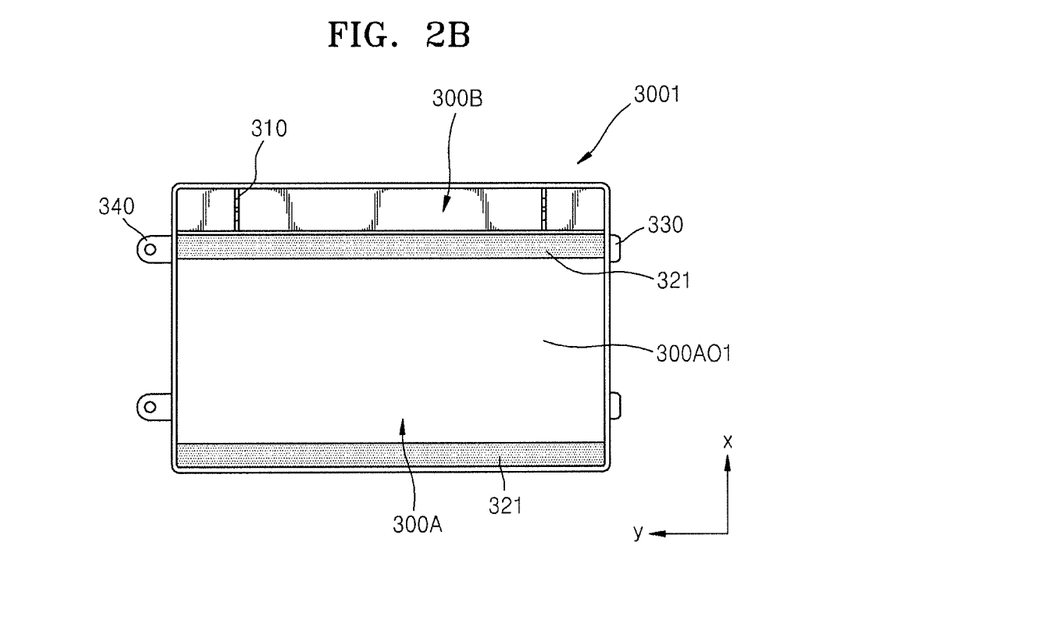
FIGS. 2B through 2D are schematic top views of a frame of a battery pack according to other embodiments of the present invention, respectively.

FIGS. 2B through 2D are schematic top views of frames according to other embodiments of the present invention. Referring to FIG. 2B, in a frame 3001 according to another embodiment of the present invention, a core pack supporting portion 321 is disposed at one side of the first region 300A so as to extend in a Y-axis direction (e.g., along a length direction of the frame 3001), and another core pack supporting portion 321 is disposed at another side (e.g., an opposite side) of the first region 300A, and thus the core pack supporting portions 321 may support the core pack 100. At least a part of the first region 300A may be opened by a first aperture 300AO1.

Figure 2C:
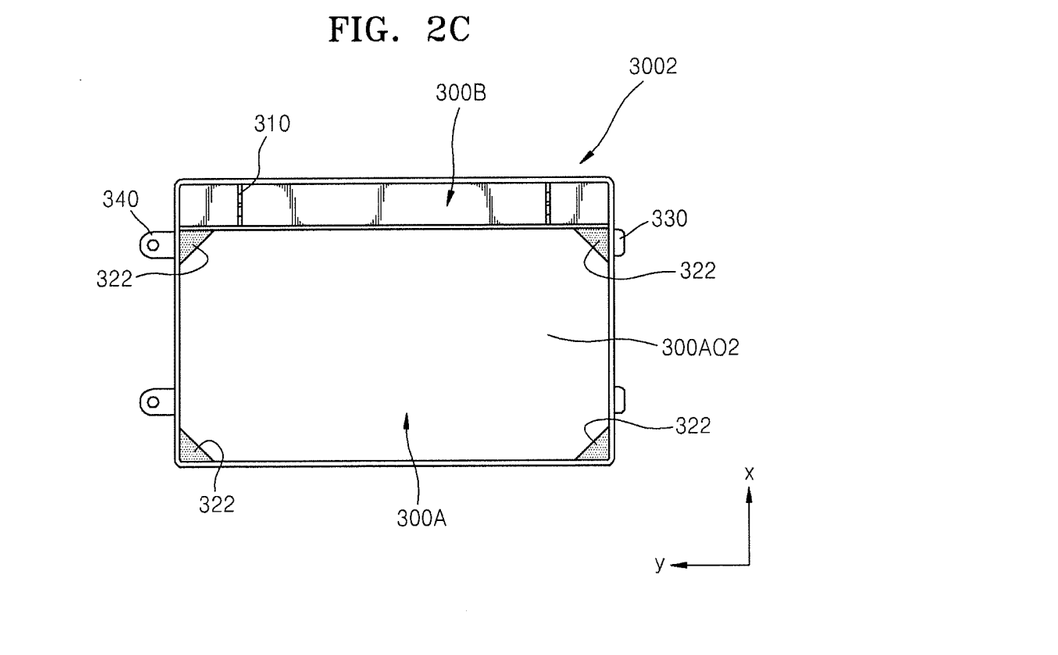
Figure 2D:
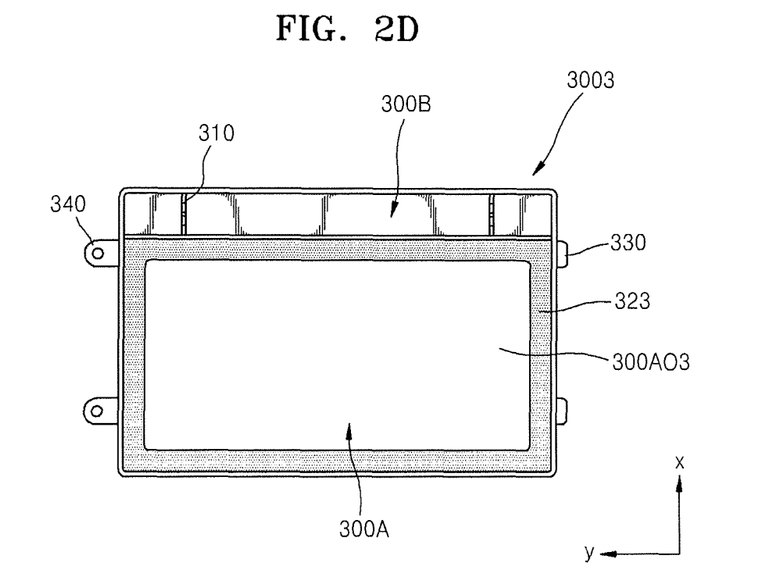

Referring to FIG. 2C, in a frame 3002 according to another embodiment of the present invention, a core pack supporting portion 322 may be formed in one or more corners (e.g., in each of four corners) of one surface of the first region 300A so as to support the core pack 100. At least a part of one surface of the first region 300A may be opened by a first aperture 300AO2. Referring to FIG. 2D, in a frame 3003 according to another embodiment of the present invention, a core pack supporting portion 323 may be formed at each of four sides of one surface of first region 300A so as to extend in both X-axis and Y-axis directions (e.g., along both length and width directions of the frame 3003). At least a part of one surface of the first region 300A may be opened by a first aperture 300AO3. Further, the configurations and positions of the core pack supporting portions 320, 321, 322, and 323 illustrated in FIGS. 2A through 2D are examples of certain embodiment, but the present invention is not limited thereto, and, in other embodiments, the configurations and positions of the core pack supporting portions 320, 321, 322, and 323 may be modified in various ways.

Figure 3:
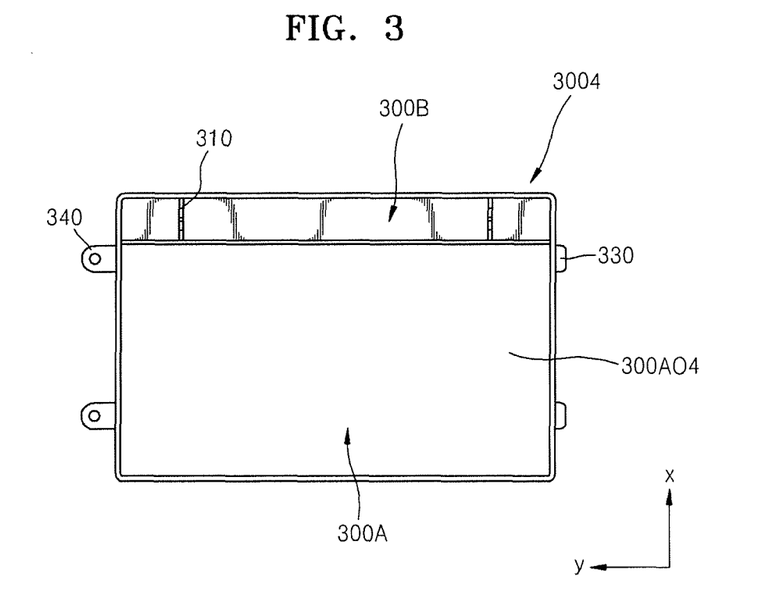
FIG. 3 is a schematic top view of a frame of a battery pack according to another embodiment of the present invention.
Figure 4:
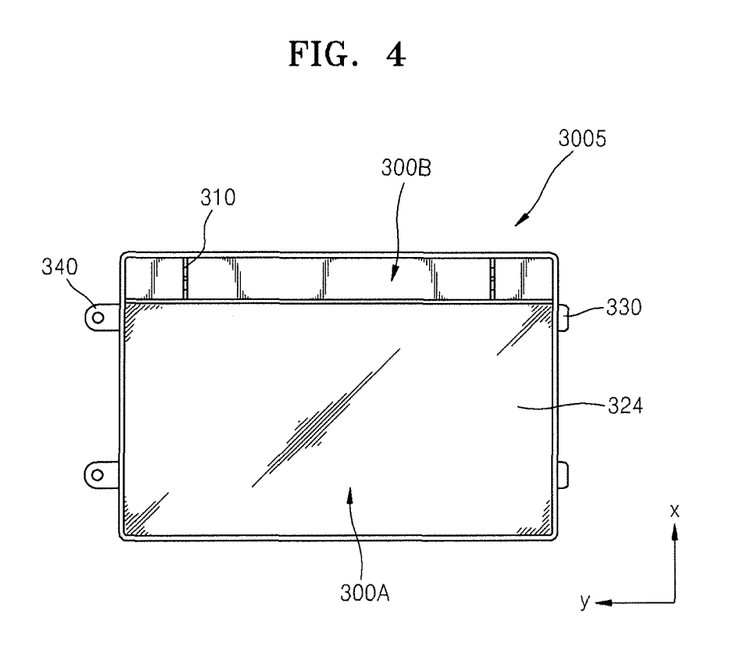
FIG. 4 is a schematic top view of a frame of a battery pack according to another embodiment of the present invention.

Also, the first aperture 300AO formed in at least one side surface of the first side surface and the second side surface of the first region 300A may be formed in various ways, which will be described with reference to FIGS. 3 and 4. FIG. 3 is a schematic top view of a frame 3004 according to another embodiment of the present invention, and FIG. 4 is a schematic top view of a frame 3005 according to still another embodiment of the present invention. Referring to FIG. 3, a first aperture 300AO4 is formed in each of opposite sides of the first region 300A so that the first region 300A passes therethrough. Referring to FIG. 4, a first aperture is formed in only one side of the first region 300A. That is, in one embodiment, a core pack supporting portion 324 extends to cover the entire first region 300A on one side thereof. As such, a structure of the first region 300A may be modified according to a method of assembly or as otherwise desired.

The second region 300B will now be described. The second region 300B includes a space for accommodating the protection circuit module 200. The second region 300B may be formed on at least one side surface of the first and second side surfaces formed in a Z-axis direction (e.g., a thickness direction of the core pack 100). In the second region 300B, the protection circuit module 200 may be accommodated in a space formed between the partition wall 301 and a first side wall 303 disposed to be opposite to the partition wall 301. As described above, in one embodiment, the first region 300A and the second region 300B may be divided by the partition wall 301. Accordingly, even when an electrolyte of the core pack 100 leaks in the first region 300A, the partition wall 301 may prevent or substantially prevent the electrolyte from entering the second region 300B. Also, in one embodiment, the second region 300B includes a space at least partially surrounded by the partition wall 301 and the first side wall 303, and the second aperture 300BO is formed only on the first side surface such that an electrolyte may not easily enter the second region 300B. As such, the protection circuit module 200 may be installed in the space where only the second aperture 300BO is opened, and thus external substances such as an electrolyte may be prevented or substantially prevented from entering the second region 300B.

Figure 5A:
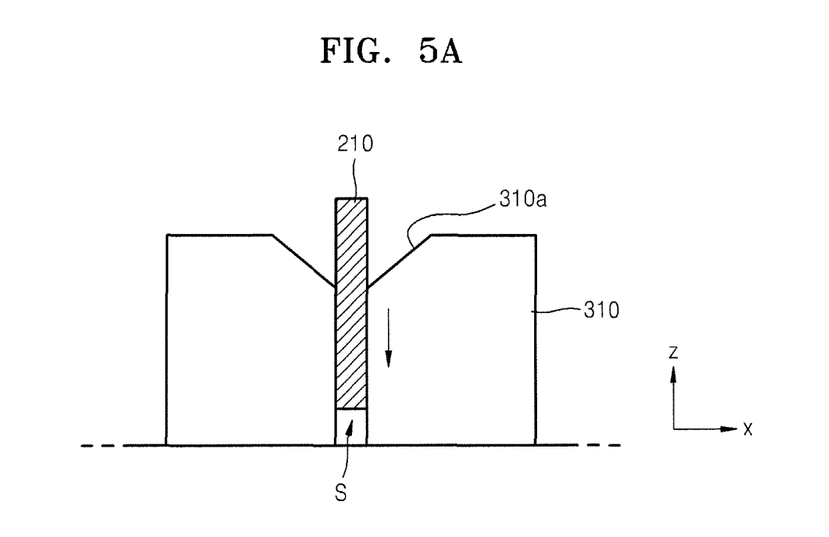
FIG. 5A is a partial cross-sectional view of the frame and a protection circuit module of the battery pack of FIG. 1, taken along the line Va-Va of FIG. 2A.

A plurality of supporting portions 310 may be formed in the second region 300B so as to support the protection circuit module 200. FIG. 5A is a cross-sectional view taken along the line Va-Va of FIG. 2A. The supporting portions 310 will now be described with reference to FIG. 5A. A slit S is formed between the supporting portions 310 so as to support the protection circuit module 200 inserted into the slit S. In one embodiment, a substrate guide portion may be formed in the supporting portion 310 so as to guide insertion of the substrate 210. For example, referring to FIG. 5A, the substrate guide portion may include an inclined surface 310a in the supporting portion 310. Accordingly, the substrate 210 of the protection circuit module 200 may be guided along the inclined surface 310a formed in the supporting portion 310 and may be mounted in the slit S. The supporting portions 310 according to one embodiment of the present invention are illustrated in FIGS. 2A and 5A. However, the shape and the number of the supporting portions 310 are not limited thereto. That is, although FIG. 2A depicts two slits S formed by the supporting portions 310, one or more slits S may be formed. Also, a structure in which the slit S is formed by the supporting portions 310 may be modified in various ways. The substrate guide portion may also be formed in various ways. Examples of supporting portions according to some other embodiments of the present invention are described below with reference to FIGS. 5B through 5D.

Figure 5B:
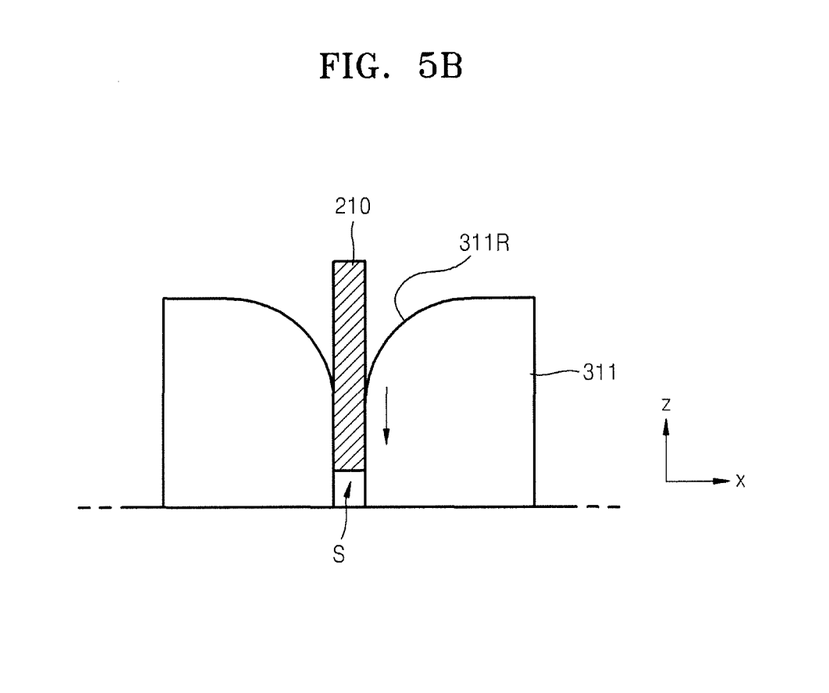
FIGS. 5B through 5D are partial cross-sectional views of a frame and a protection circuit module of a battery pack according to other embodiments of the present invention, respectively.
Figure 5C:
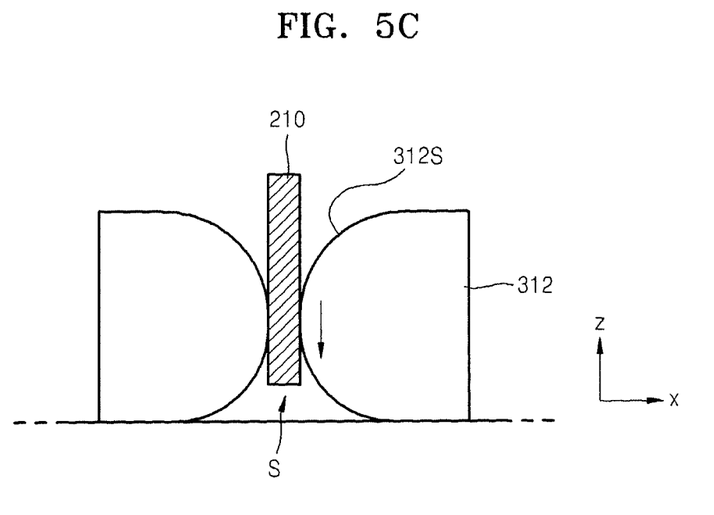
Figure 5D:
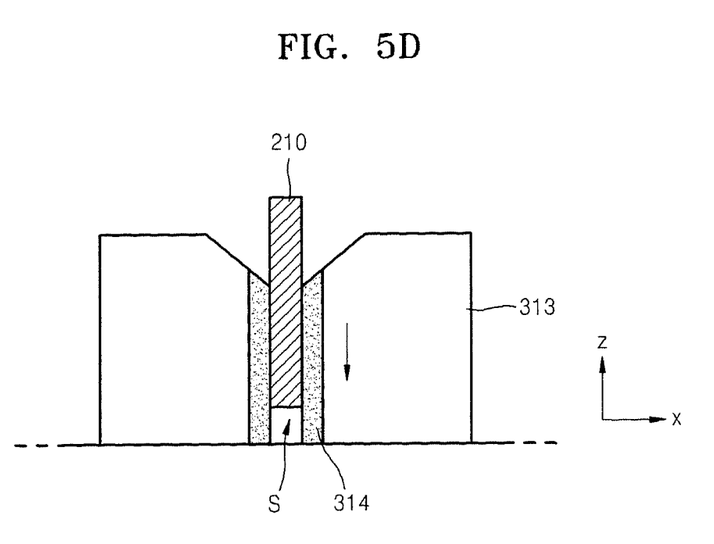

FIGS. 5B through 5D are cross-sectional views showing supporting portions according to some other embodiments of the present invention. Referring to FIG. 5B, in one embodiment, a substrate guide portion may be formed in a supporting portion 311 as a curved surface 311R. Accordingly, the substrate 210 may be mounted in the slit S formed between the supporting portions 311 along the curved surface 311R. Referring to FIG. 5C, in another embodiment, a substrate guide portion may be formed in a supporting portion 312 as a curved surface 312S of which a cross-section has a semicircular shape. Accordingly, the substrate 210 may be mounted in the slit S along the curved surface 312S. The shapes of the supporting portions 310, 311, and 312 and the configurations of the substrate guide portions are not limited to the embodiments shown and described, however, and may be modified in various ways. Also, referring to FIG. 5D, an elastic portion 314 may be formed in a supporting portion 313 so as to mount the substrate 210 in the slit S. The elastic portion 314 may include an elastic member, and thus the substrate 210 may be stably supported by an elastic force of the elastic portion 314.

Referring back to FIG. 2A, the frame 300 may include a plurality of fastening portions 330 and a plurality of screw receiving portions 340. The battery pack 1 may accommodate the core pack 100 therein and may be connected to an electronic device. Further, the battery pack 1 and an object to be fastened may respectively include fastening members connected to each other. In this regard, the object to be fastened may be, for example, a portable computer. That is, the battery pack 1 may be connected to the portable computer as a power supply device, and the frame 300 may include the fastening portions 330 and screw receiving portions 340 so as to facilitate connection between the battery pack 1 and the portable computer. That is, if the fastening portions 330 disposed at one side are fastened to grooves formed in the object to be fastened (e.g., the portable computer), the frame 300 may be coupled to the object to be fastened via screw receiving holes 340a of the screw receiving portions 340 formed opposite to the fastening portions 330. In this regard, in one embodiment, the screw receiving portions 340 may be disposed at one side of the frame 300, and the fastening portions 330 may be disposed at the other side of the frame 300.

Figure 6:
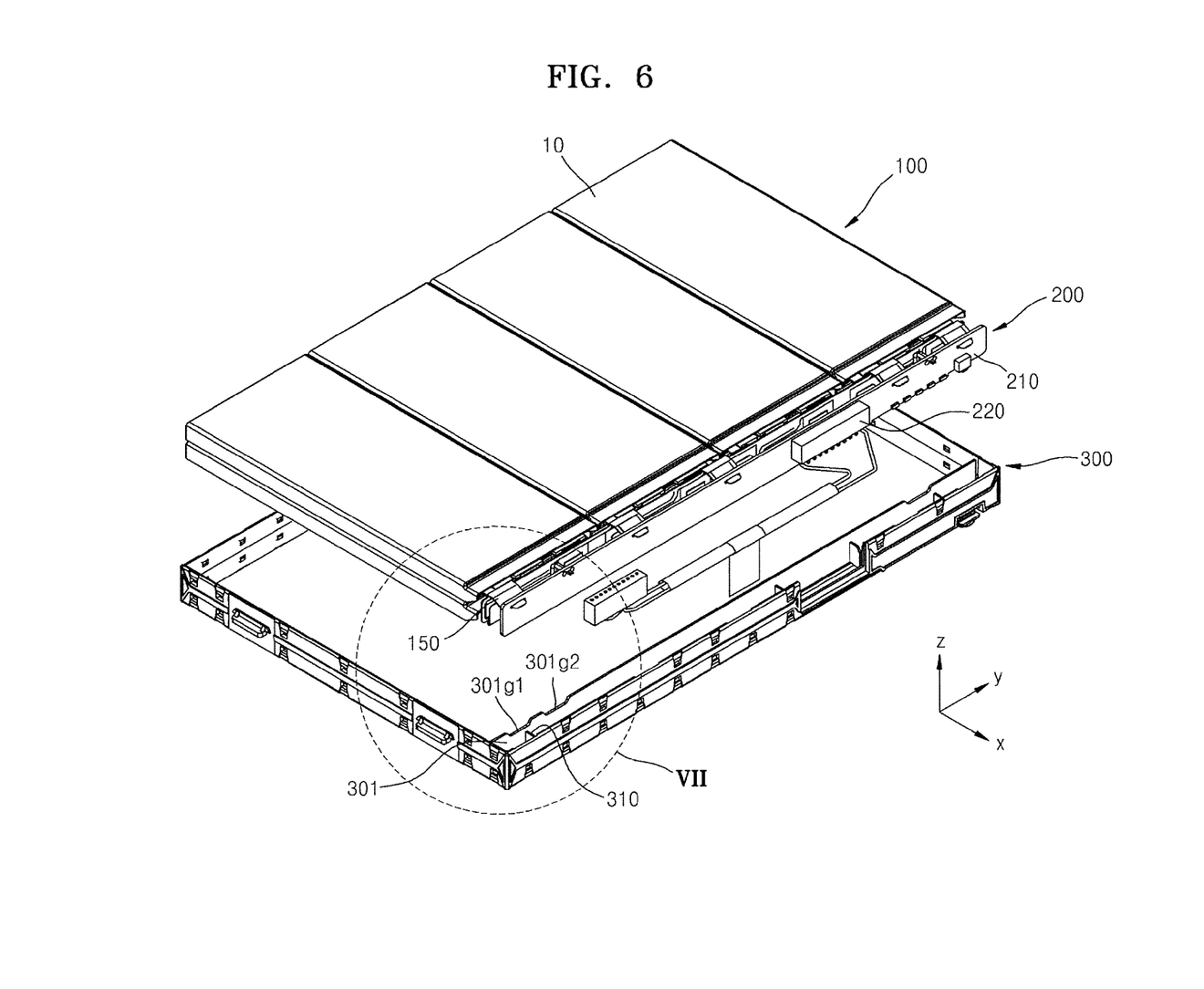
FIG. 6 is a schematic exploded perspective view of a battery pack according to an embodiment of the present invention.
Figure 7:
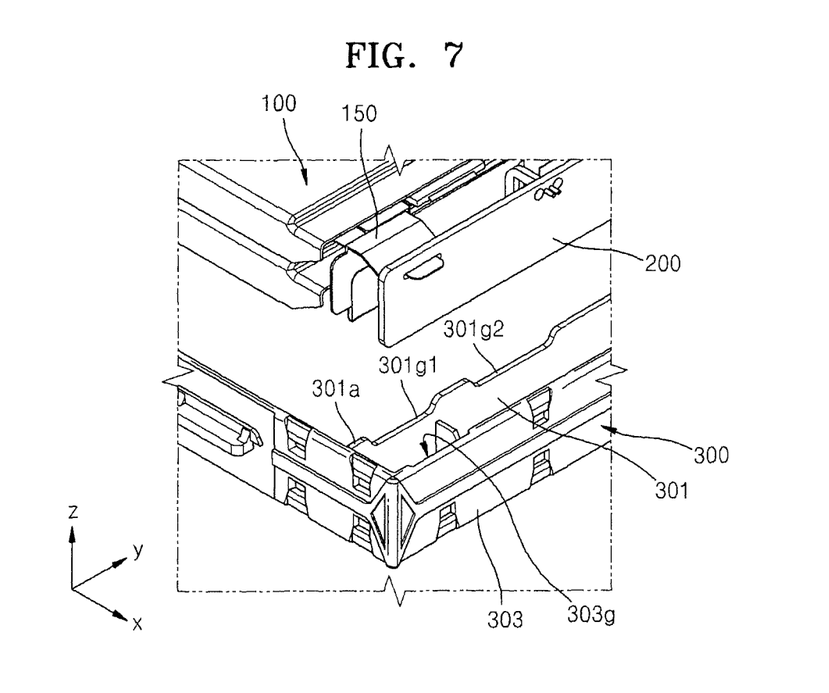
FIG. 7 is a schematic exploded perspective detail view of the battery pack of FIG. 6, showing the region VII.
Figure 8:
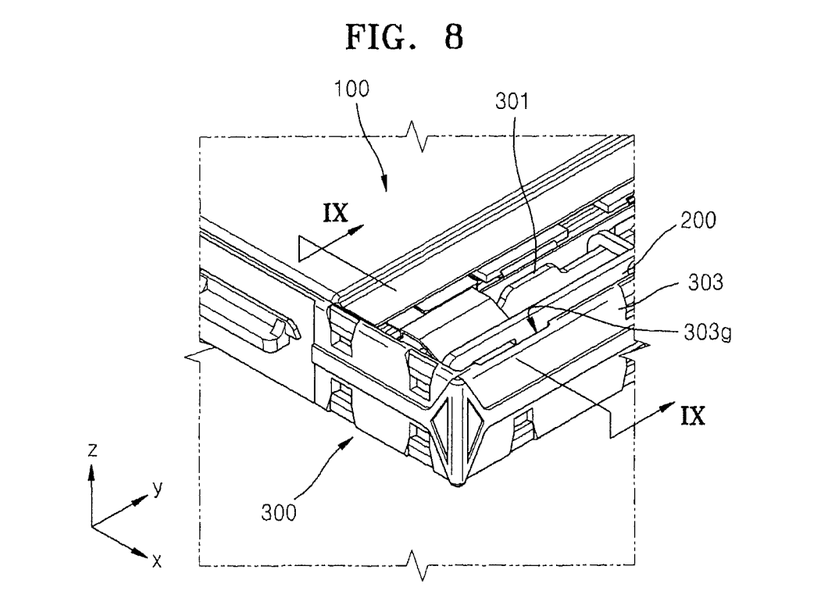
FIG. 8 is a schematic perspective detail view of the battery pack of FIG. 6, shown in a state in which a frame, a core pack, and a protection circuit module of the battery pack are coupled to one another.
Figure 9:
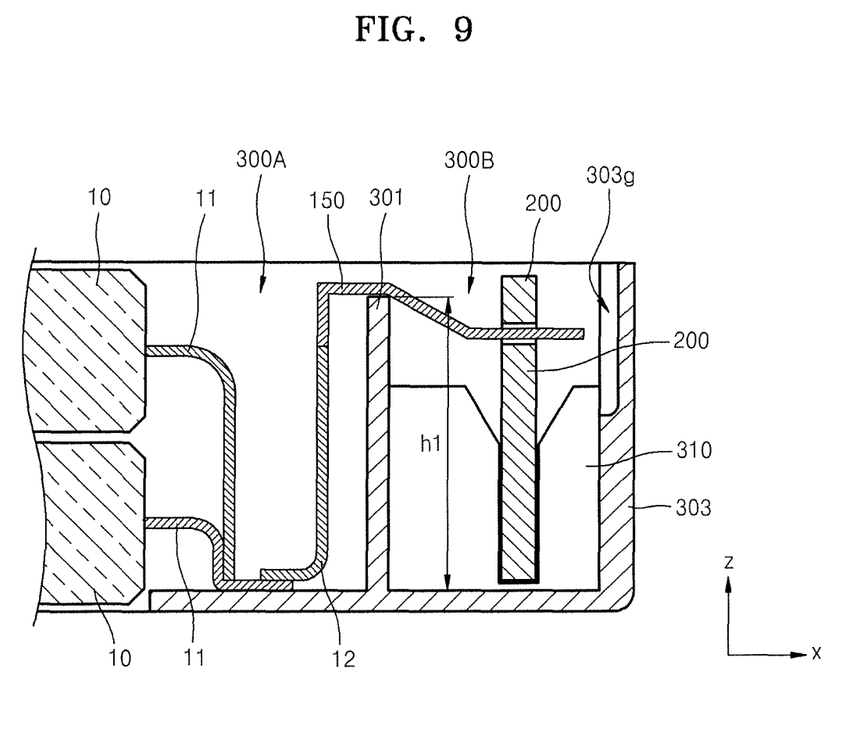
FIG. 9 is a partial schematic cross-sectional view of the battery pack of FIG. 8, taken along the line IX-IX.

A coupling relationship between the core pack 100, the protection circuit module 200, the frame 300, and a connection tap 150 for connecting the protection circuit module 200 and the core pack 100 will now be described according to an embodiment of the present invention. FIG. 6 is a schematic exploded perspective view of the battery pack 1 showing the frame 300, the core pack 100, and the protection circuit module 200 to be coupled to one another. FIG. 7 is a schematic exploded perspective detail view of region VII of FIG. 6. FIG. 8 is a schematic perspective detail view illustrating an example of the battery pack 1 of FIG. 6 in which the frame 300, the core pack 100, and the protection circuit module 200 are coupled to one another. FIG. 9 is a schematic cross-sectional view taken along a line IX-IX of FIG. 8.

The core pack 100 and the protection circuit module 200 may be electrically connected to each other by the connection tap 150. An end of the connection tap 150 may be connected to the core pack 100, and the other end of the connection tap 150 may be connected to the protection circuit module 200. A connection between the connection tap 150 and the core pack 100 will now be described. For example, the core pack 100 may include the plurality of unit cells 10, and each unit cell 10 may include an electrode 11 extending from the unit cell 10, and the electrode 11 may be connected to a connection member 12. The connection tap 150 may be connected to the connection member 12 or may be integrally formed with the connection member 12. The connection tap 150 may be connected to the unit cell 10 so as to be electrically connected to the core pack 100. In this regard, the connection tap 150 is a conductor, and may include, for example, nickel.

In one embodiment, the connection tap 150 may be bent and pass through an upper portion 301a of the partition wall 301 so as to be connected to the protection circuit module 200 via the second aperture 300BO of the second region 300B. A first groove 301g1 may be formed in the upper portion 301a of the partition wall 301 so as to correspond to the connection tap 150. That is, the partition wall 301 may be disposed between bent portions of the connection tap 150. Also, the protection circuit module 200 may include a thermister, and a second groove 301g2 may be formed in the upper portion 301a of the partition wall 301 so as to correspond to the thermister. As such, in one embodiment, the first groove 301g1 and the second groove 301g2 are formed in the partition wall 301, and the connection tap 150 and the thermister pass through the first groove 301g1 and the second groove 301g2, respectively, thereby allowing the overall size of the battery pack 1 to be smaller.

In one embodiment, the partition wall 301 may extend by a height h1 in order to maintain a shape. As such, since the partition wall 301 has the height h1, an electrolyte generated in the first region 300A may be prevented or substantially prevented from entering the second region 300B.

The partition wall 301 may extend in a lengthwise direction (e.g., in a Y-axis direction) of the protection circuit module 200. In one embodiment, the partition wall 301 and the substrate 210 of the protection circuit module 200 may be disposed to face each other and may be disposed parallel to each other. The connection tap 150 and the protection circuit module 200 may be connected to each other by soldering, for example. A groove 303g may be formed in the first side wall 303 so as to correspond to the connection tap 150 for increasing workability of the connection tap 150 and the protection circuit module 200. As such, since the groove 303g is formed in the first side wall 303, a minimum space for operating a working tool used to couple the connection tap 150 and the protection circuit module 200 may be obtained.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made without departing from the spirit and scope of the present invention as set forth in the following claims.

What is claimed is:

1. A battery pack comprising:
a core pack comprising a unit cell;
a protection circuit module electrically connected to the core pack, the protection circuit module comprising a substrate and a protection device mounted on a surface of the substrate; and
a frame comprising a first region accommodating the core pack, and a second region accommodating the protection circuit module,
wherein the frame further comprises:
a supporting portion supporting the protection circuit module in the second region; and
a partition wall dividing the first region and the second region from each other, the partition wall and a side wall of the frame being spaced apart in a first direction to define the second region therebetween, and
wherein a surface of the partition wall faces the protection circuit module and is parallel to the surface of the substrate having the protection device mounted thereon, and wherein the surface of the substrate having the protection device mounted thereon faces the first direction.

2. The battery pack of claim 1, wherein the partition wall extends in a lengthwise direction of the protection circuit module.

3. The battery pack of claim 1, wherein the frame has an opening formed on at least one of a first side surface or a second side surface opposite the first side surface.

4. The battery pack of claim 1, wherein the frame further comprises a core pack supporting portion supporting the core pack.

5. The battery pack of claim 4, wherein the core pack supporting portion extends along at least a part of an edge of the first region.

6. The battery pack of claim 5, wherein the core pack supporting portion extends in a lengthwise direction of the protection circuit module.

7. The battery pack of claim 5, wherein the core pack supporting portion is arranged at each corner of the first region.

8. The battery pack of claim 1, wherein the frame has a rectangular band shape that is parallel to a thickness direction of the core pack.

9. The battery pack of claim 1, further comprising a connection tap including an end connected to the core pack and another end connected to the protection circuit module, wherein the connection tap is bent.

10. The battery pack of claim 9, wherein the frame has an opening formed on at least one of a first side surface or a second side surface of the second region, and the connection tap is connected to the protection circuit module via the opening.

11. The battery pack of claim 9, wherein the partition wall is between first and second portions of the bent connection tap.

12. The battery pack of claim 11, wherein a groove is formed in the partition wall at a location corresponding to the first and second portions of the connection tap.

13. The battery pack of claim 9, wherein the protection circuit module is between the partition wall and the side wall, and wherein a groove is formed in the side wall at a location corresponding to a bent portion of the connection tap.

14. The battery pack of claim 1, wherein the protection circuit module comprises a thermister, and a groove is formed in the partition wall at a location corresponding to the thermister.

15. The battery pack of claim 1, wherein a slit is formed in the supporting portion, and the protection circuit module is supported in the slit.

16. The battery pack of claim 1, wherein the supporting portion comprises a substrate guide portion.

17. The battery pack of claim 1, wherein the supporting portion comprises an elastic portion for supporting the protection circuit module.

18. The battery pack of claim 1, wherein the frame further comprises a fastening portion extending from the frame and configured to be fastened to an object.

19. The battery pack of claim 1, further comprising a cover accommodating the core pack therein, the cover being coupled to the frame.

* * * * *